(12) United States Patent
Sanchez et al.

(10) Patent No.: US 8,292,198 B1
(45) Date of Patent: Oct. 23, 2012

(54) SPRINKLER SYSTEM

(76) Inventors: Francisco Sanchez, Orlando, FL (US); Luis Sanchez, Hialeah, FL (US)

( * ) Notice: Subject to any disclaimer, the term of this patent is extended or adjusted under 35 U.S.C. 154(b) by 97 days.

(21) Appl. No.: 12/914,325

(22) Filed: Oct. 28, 2010

(51) Int. Cl.
*B05B 3/00* (2006.01)

(52) U.S. Cl. ........ 239/208; 239/204; 239/207; 239/289; 52/16

(58) Field of Classification Search .................. 239/203, 239/204, 207–209, 289; 169/13, 16, 37, 169/54; 52/16
See application file for complete search history.

(56) References Cited

U.S. PATENT DOCUMENTS

| | | |
|---|---|---|
| 2,865,674 A | 12/1958 | Jelmeland |
| 4,183,368 A | 1/1980 | Husted |
| 4,363,335 A | 12/1982 | Tapper |
| 4,972,863 A | 11/1990 | Morrow |
| 5,406,966 A | 4/1995 | Lepkowski et al. |
| 5,727,350 A | 3/1998 | Marcella |
| 5,732,511 A | 3/1998 | Scott |
| 6,629,569 B1 * | 10/2003 | Adams ........................ 239/204 |
| 6,926,210 B2 | 8/2005 | Baxter |
| 6,964,379 B2 * | 11/2005 | Crowley ...................... 239/208 |
| D542,886 S | 5/2007 | Crowley |
| 7,886,837 B1 * | 2/2011 | Helfgott ......................... 169/54 |
| 2009/0001195 A1 * | 1/2009 | Blank ........................... 239/208 |

* cited by examiner

*Primary Examiner* — Steven J Ganey

(57) ABSTRACT

The present invention features a lawn sprinkling system, which comprises a gutter disposed along the side of a building structure, a sprinkler head disposed within the gutter, a water supply, and a water supply pipe. The water supply pipe is disposed within a recess alongside the down spout, and water supply pipe fluidly connects to the sprinkler head and to the water supply.

4 Claims, 4 Drawing Sheets

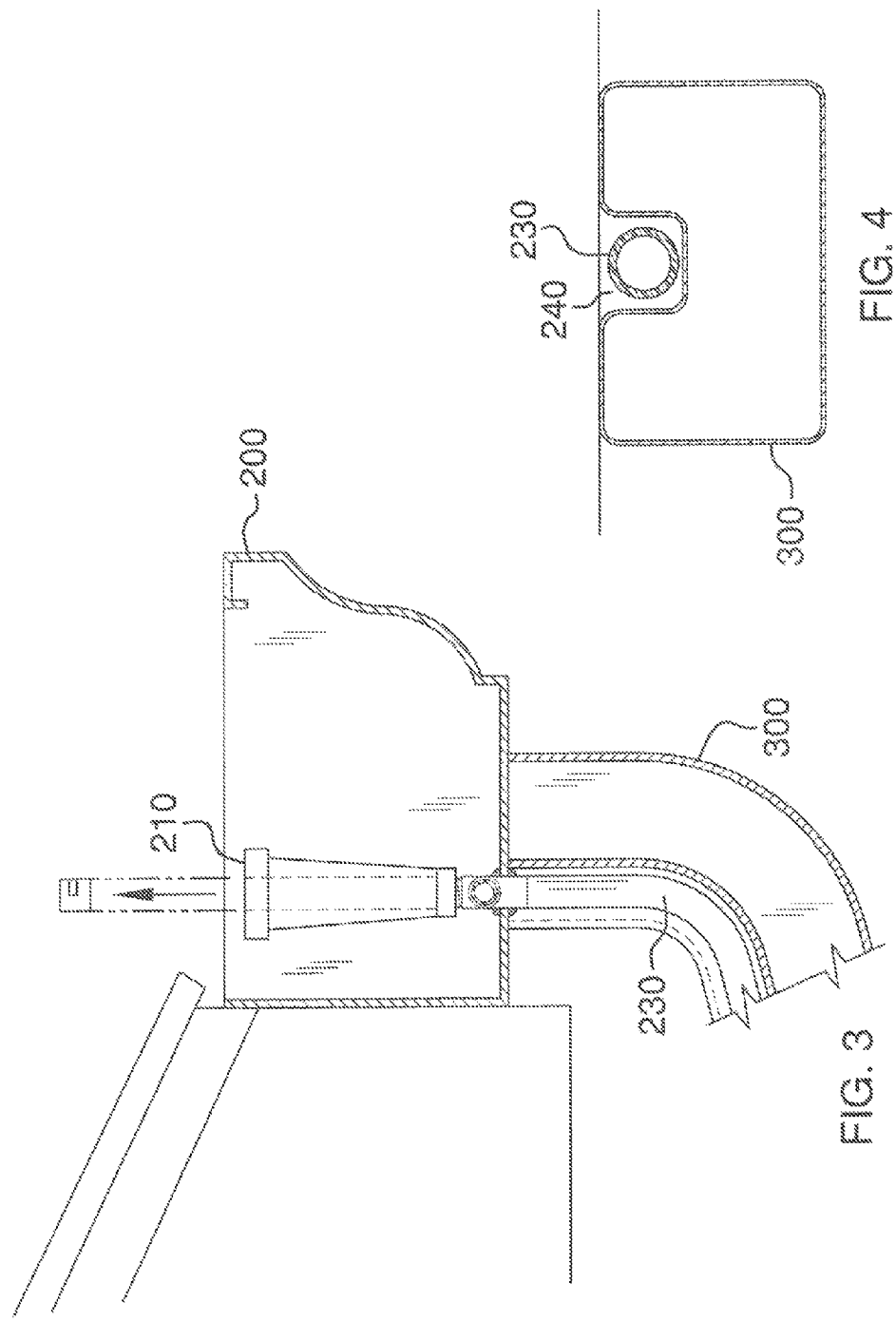

SPRINKLER SYSTEM

FIELD OF THE INVENTION

The present invention is directed to a lawn sprinkling system where the pop-up sprinkler heads are disposed inside the gutter.

BACKGROUND OF THE INVENTION

The present invention features a lawn sprinkling system which allows easy installation, fewer repairs, and better aesthetics compared to an underground system. An underground system requires messy digging of the lawn for installation, and the sprinkler heads are subject to breaking when a lawn mower is used. In addition, the sprinkler heads of an underground system are clearly visible. In the present invention the lawn sprinkling system is installed in the gutter of the house, so the sprinkler heads are only visible when the system is in use. The present invention is added to the existing gutter, so there is no mess or disruption of existing structures. The sprinkler heads of the present invention are not subject to any weight-bearing objects such as a lawn mower and so avoid the hazards of being broken.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 3 is a cross sectional side view of the lawn sprinkling system of the present invention.

FIG. 4 is a top view of the gutter of the lawn sprinkling system of the present invention.

DESCRIPTION OF PREFERRED EMBODIMENTS

Figure 1:
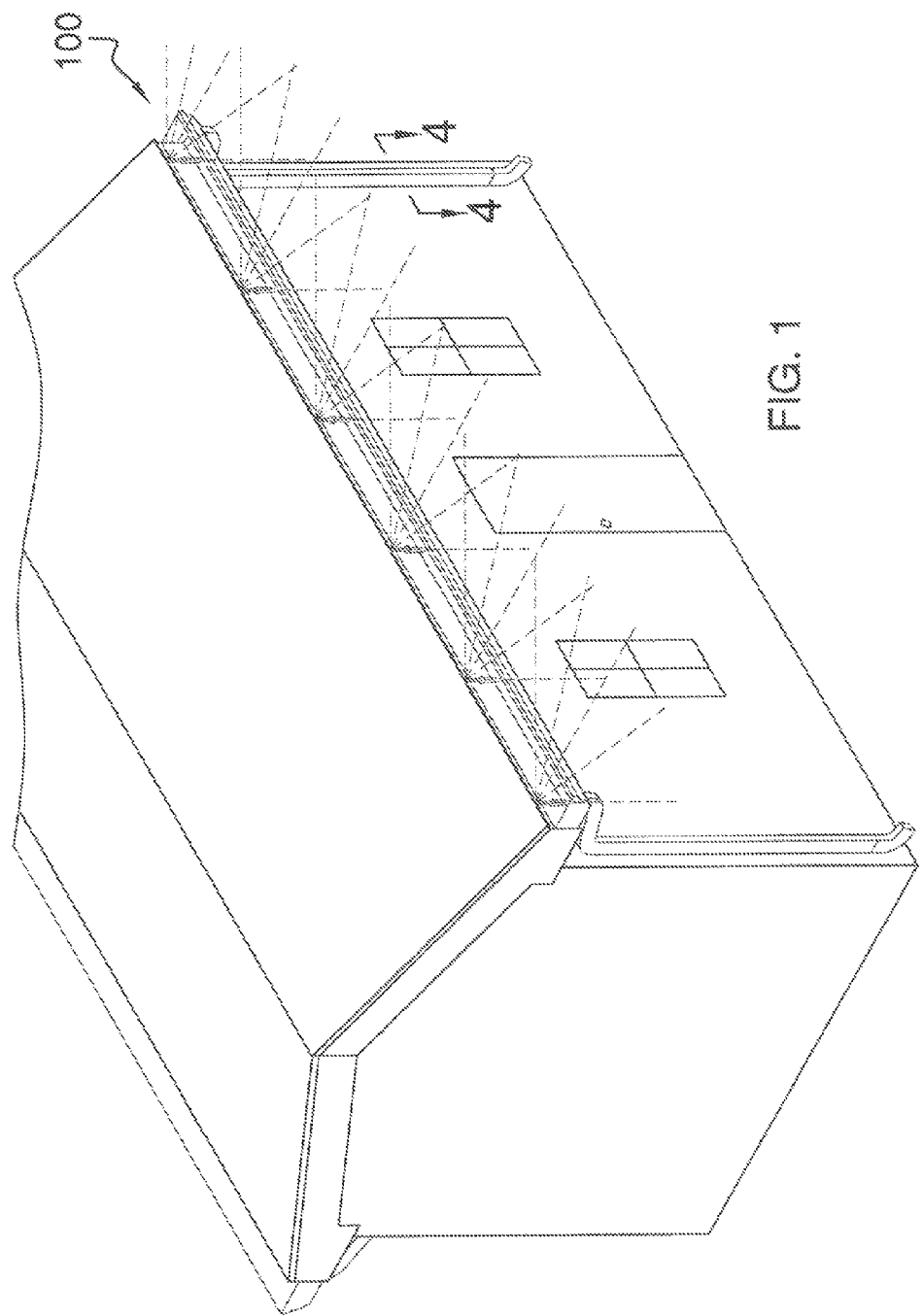
FIG. 1 is a perspective view of the lawn sprinkling system of the present invention.
Figure 2:
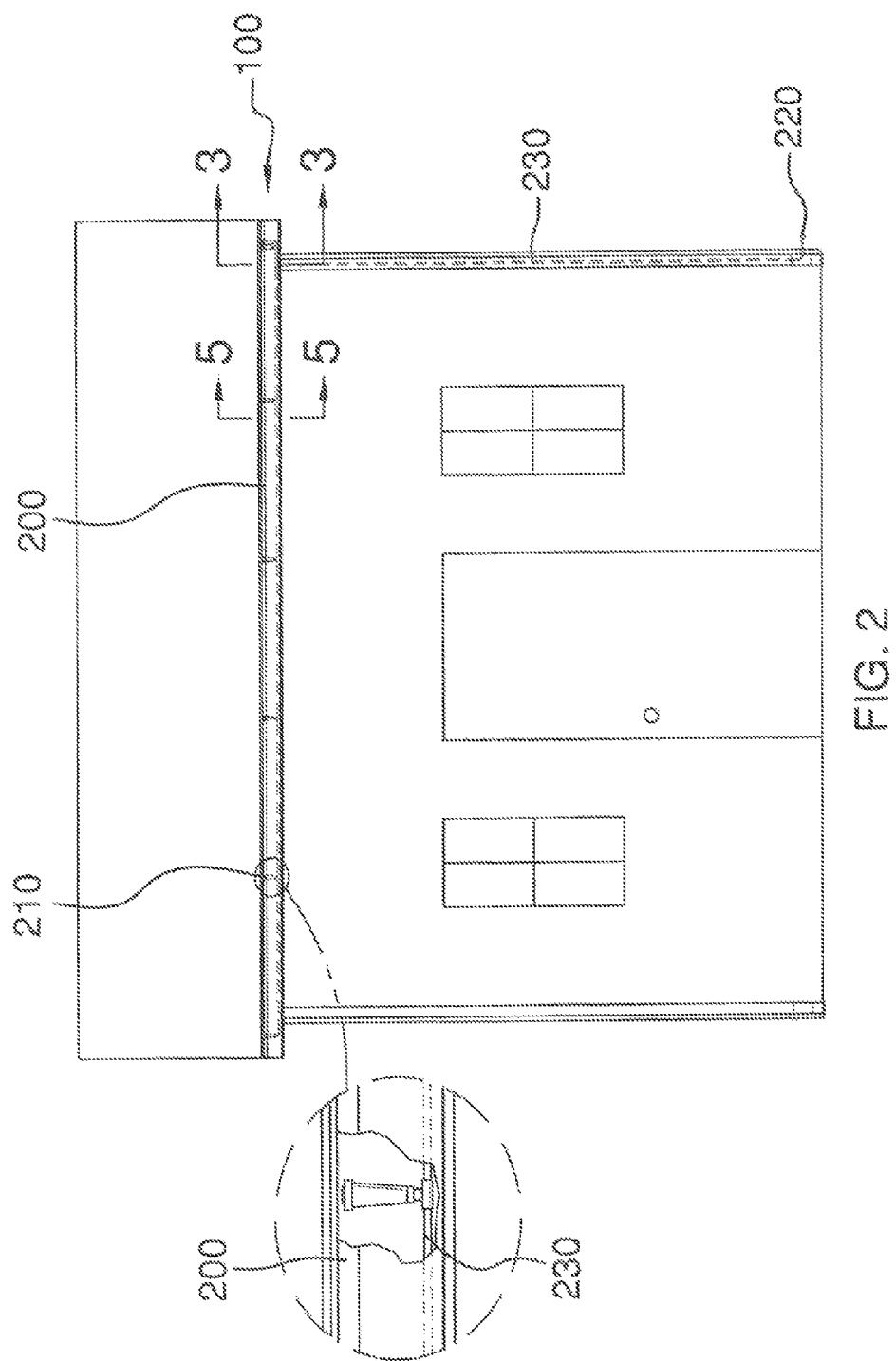
FIG. 2 is a front view of the lawn sprinkling system of the present invention.
Figure 5:
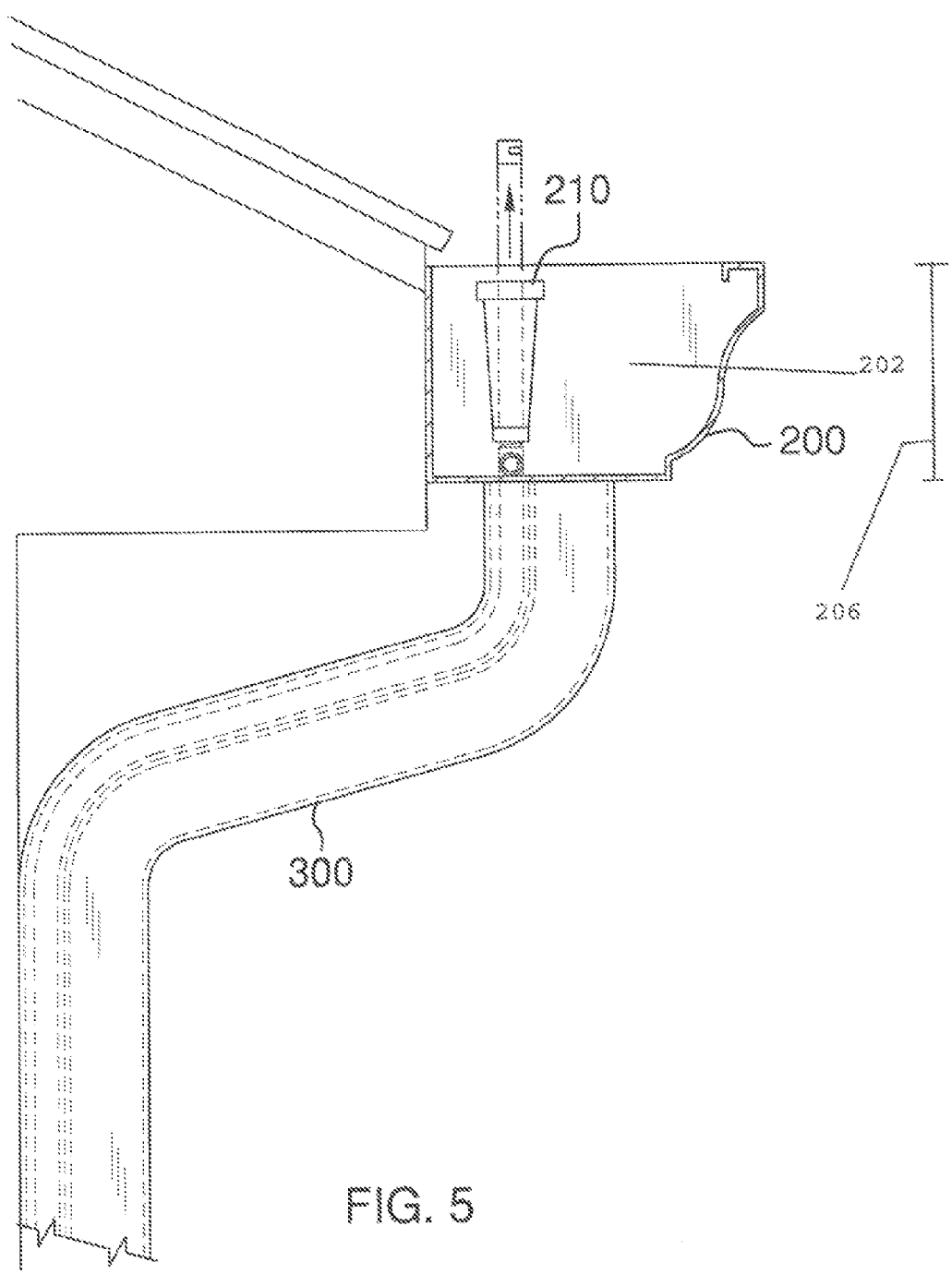
FIG. 5 is a cross-sectional side view of the lawn sprinkling system of the present invention, where the sprinkler head is disposed in the cavity 202 of the gutter 200. The height 206 of the gutter wall is higher than that of the height of the sprinkler head in its retracted position.

The following is a listing of numbers corresponding to a particular element refer to herein:
100 lawn sprinkling system
200 gutter
210 sprinkler head
220 water supply
230 water supply pipe
240 recess for water supply pipe
300 down spout Referring now to FIGS. 1-4, the present invention features a lawn sprinkling system 100, which comprises a gutter 200 is generally disposed horizontally along the side of a building structure, a sprinkler head 210 disposed within the gutter, a water supply 220, and a water supply pipe 230. The water supply pipe 230 is disposed within a recess 240 alongside the down spout 300, and also within the cavity 201 of the gutter 200, and water supply pipe 230 fluidly connects to the sprinkler head 210 and to the water supply 220. A cavity 201 of the gutter 200 is where rain water is normally collected after rain water roils off the roof and into the gutter.

The sprinkler head 210 is a pop-up and is either in an extended position or a retracted position. When the sprinkler head 210 is in an extended position, it extends beyond the height of a gutter wall 200 and shoots water towards a lawn away from the building. When the sprinkler head 210 is in a retracted position, the sprinkler head 210 drops below the height of the gutter wall 200 and is hidden from view. When water is introduced into the water supply pipe 230, the water pushes the sprinkler head 210 to pop up into its extended position; when water is not being introduced into the water supply pipe 230, the sprinkler head 210 returns to its retracted position.

In some embodiments, the gutter 200 is constructed from a material comprising a rigid material. The rigid material appropriate for the gutter 200 may comprise plastic or metal or some composite material containing such elements.

In some embodiments, the water supply pipe 230 is constructed from a material comprising a rigid material. The rigid material appropriate for the water supply pipe 230 may comprise plastic or metal or some composite material containing such elements.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A lawn sprinkling system, the system comprising:
   (a) a gutter disposed horizontally along the side of a building structure;
   (b) a sprinkler head disposed within a cavity of the gutter;
   (c) a water supply;
   (d) a water supply pipe, wherein the water supply pipe is disposed within the cavity of the gutter; wherein the water supply pipe is disposed within a recess disposed in a back side of the down spout between the down spout and a mounting surface, wherein the pipe fluidly connects to the sprinkler head;
   wherein the sprinkler head is a pop-up; when the sprinkler head is in an extended position, it extends beyond the height of a gutter wall and shoots water towards a lawn away from the building; when the sprinkler head is in a retracted position, the sprinkler head drops below the height of the gutter wall and is hidden from view; when water is introduced into the water supply pipe, the water pushes the sprinkler head to pop up into its extended position; when water is not being introduced into the water supply pipe, the sprinkler head returns to its retracted position.

2. The lawn sprinkling system of claim 1, wherein the gutter is constructed from a material comprising a rigid material.

3. The lawn sprinkling system of claim 1, wherein the water supply pipe is constructed from a material comprising a rigid material.

4. The lawn sprinkling system of claim 1, wherein the water supply pipe is connected to the sprinkler heads and to the water supply.

* * * * *